W. T. S. O'BRIEN.
SKETCHING APPARATUS.
APPLICATION FILED AUG. 24, 1911.

1,111,608.

Patented Sept. 22, 1914.
3 SHEETS—SHEET 1.

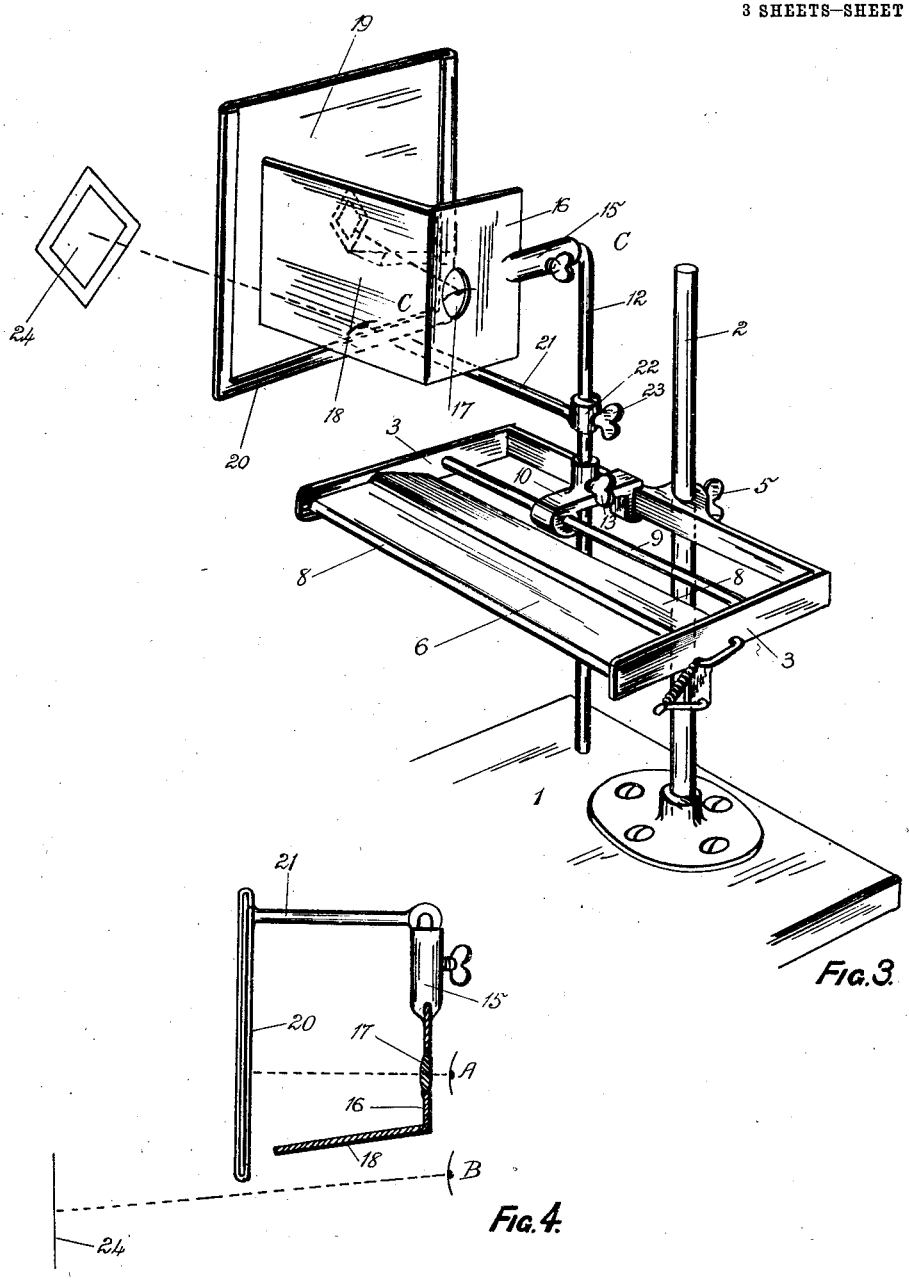

UNITED STATES PATENT OFFICE.

WALTER THOMAS SMITH O'BRIEN, OF NORTH SYDNEY, NEW SOUTH WALES, AUSTRALIA.

SKETCHING APPARATUS.

1,111,608. Specification of Letters Patent. Patented Sept. 22, 1914.

Application filed August 24, 1911. Serial No. 645,709.

*To all whom it may concern:*

Be it known that I, WALTER THOMAS SMITH O'BRIEN, a subject of the King of Great Britain and Ireland, and resident of 37 Ernest street, North Sydney, in the State of New South Wales, Commonwealth of Australia, have invented certain new and useful Improvements in Sketching Apparatus, of which the following is a specification.

This apparatus has for its object the visually projecting of a picture, print, photograph, map, object or such like on to a blank sheet or other surface suitable for drawing upon for the purpose of aiding the reproduction thereof by free hand drawing, or by painting in colors. It also facilitates the reproduction by free hand drawing of studies from life and still life.

I have discovered that when an object is viewed through a lens of certain form by one eye of the observer, and screened from the direct vision of the other eye, the latter sees a visual projection of the object thrown upon any suitably positioned surface and if the projection is sufficiently clear and distinct, as, for instance, upon a blank sheet of paper or the like, the visionary picture may be traced by a pen or pencil held in the hand of the observer. As the visual projection also shows clearly the shading and colors these may be reproduced by suitable means, as for example line shading or brushwork.

The invention herein described consists therefore of an apparatus designed and adapted to carry the optical lens, a table or platform to receive and support the object, a screen to separate the lines of vision of the eyes, and a support for the surface upon which the visual projection is thrown, the whole being arranged in one complete apparatus provided with the necessary means for focusing the object and for advancing or retiring the reproducing surface according to the scale upon which it is desired that the reproduction should be drawn.

The apparatus may be constructed and arranged in two modifications, one of which is adaptable for the reproduction of an object which may be conveniently arranged upon the table or platform, while the other is for the reproduction on a reduced scale of objects which by reason of their size, position or permanent location cannot conveniently be manipulated.

In order to give a practical illustration of the invention I will now refer to the accompanying sheets of drawings forming part of this specification and in which:—

Figure 1:
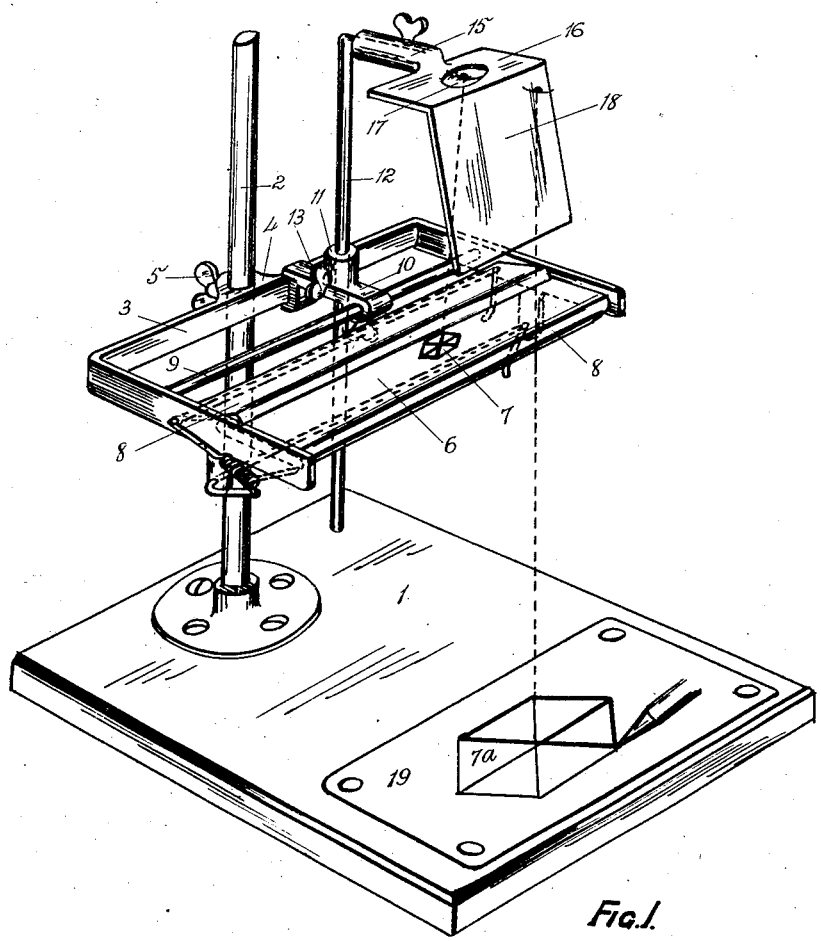
Figure 2:
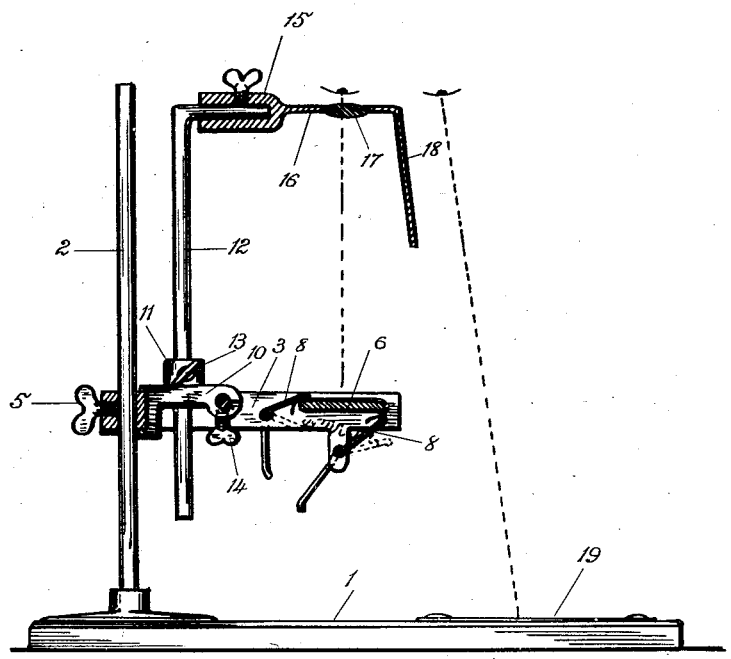

Figure 1 is a perspective view of the apparatus constructed and arranged for the reproduction of an object placed upon the platform; Fig. 2 is a vertical section through the same; Fig. 3 is a perspective view of the apparatus modified to facilitate reproduction from life or large objects, and Fig. 4 is a horizontal section thereof on line C. C. showing the approximate position of the eyes when using the apparatus.

1 is the base upon which is erected the post 2 supporting the carrier frame 3 mounted upon the boss 4. This boss is capable of vertical and rotary movement upon the post 2, and a set screw 5 serves to secure it in position.

The frame 3 supports the table 6 upon which the picture 7 or such like to be reproduced is placed and held in position by the spring actuated clips 8. 8. The carrier frame 3 also supports a horizontally placed bar 9 upon which is mounted a slider 10 capable of transverse movement along the bar 9. This slider is formed with a boss 11 which supports a rod 12 capable of vertical and rotary movement therein. A set screw 13 locks the rod 12 in position and another set screw 14 locks the slider 10 upon the bar 9.

Upon the upper end of the rod 12 is pivoted a horizontally placed arm 15 which supports at its outer end a frame 16. In this frame is mounted a sector of a double convex lens 17 and pendant from it is a screen 18. The drawing sheet, block, or such like is shown at 19.

In the modification shown in Figs. 3 and 4 the frame 16 carrying a sector of a double convex lens 17 is swung into a vertical position to enable the operator to work from a life study or a large object which could not conveniently be placed horizontally on a table. In the modification, the sheet of drawing paper or sketching block 19 is held by the vertical frame 20 which is supported from the rod 12 by an arm 21 secured to the boss 22 and capable of vertical movement upon the rod 12. A set screw 23 secures said arm in position. The object to be drawn is shown at 24.

Referring to Figs. 1 and 2, the object to be reproduced is placed upon the table 6 and if necessary secured by the clips 8. 8. The lens 17 is focused upon the picture by means of the vertical adjustment provided by the movement of the rod 12 within its boss 11. Adjustment then is made between the picture 7 and the drawing sheet or block 19 by moving the carrier frame 3 vertically upon the post 2 so as to advance or retire that portion of the apparatus carrying the lens 17 and picture 7 to or from the drawing sheet or block. By this means the scale or size to which the reproduction is to be made may be varied to suit requirements, thus if the carrier frame is advanced toward the sketching block the visual projection will be on a smaller scale than if it is retired from it.

In carrying out the invention the operator having placed his object 7 upon the table 6 and, if necessary, secured it in position by the spring clips 8, focuses the lens 17 upon it. He then adjusts the table to conform to the scale to which he wishes to draw the copy, adjusting the table upwardly to reproduce a picture on a large scale or downwardly to reproduce it on a small scale. To enable him to do this he views the picture with one eye placed close to the lens 17 and with the other eye the visual projection 7ª of the picture on the drawing paper 19. If he sketches with his right hand he views the picture with his left eye "A" and with the right eye "B" the drawing paper. If he wishes to sketch with his left hand he reverses the position of the apparatus so that he then views the picture with his right eye "B" and the drawing paper with his left eye "A." The screen 18 effectually cuts off the operator's view of the picture from that of the drawing paper.

The effect of observing the picture 7 with one eye through the lens 17 and the blank drawing paper 19 with the other as described shows the viewer a visual projection of the picture on the blank paper which he may readily trace with pen or pencil. Should the picture be in colors these will be clearly shown in the visual projection and may be readily reproduced in the copy.

If the picture to be copied is so large that it occupies a space larger than that provided by the surface of the table the picture is folded down over the edges of the table 6 by the clips 8, the portion to be copied resting upon the horizontal surface of the table 6. Upon that portion being completed it is drawn forward and a fresh piece exposed to view. In the same way if the picture cannot be viewed for its entire height without distortion, the slider 10 carrying the lens 17 is moved along the horizontal bar 9 to enable it to be viewed correctly, the slider being locked in position by the set screw 13 when the draftsman is at work.

Referring to Figs. 3 and 4 in the modification the apparatus is adapted to enable the copying of large objects, which cannot conveniently be done by the use of the apparatus shown in Figs. 1 and 2, to be accomplished, such for instance as studies from life or still life. In this case the frame carrying the lens 17 which is identical with that shown in Figs. 1 and 2 is swung around until it assumes a vertical position. A horizontal arm 21 supports a vertically placed frame 20 which in turn supports the drawing surface. The operator views the object to be drawn, marked 24 with one eye "B" and with the other eye "A" pressed close to the lens 17 views a visual projection of that object on the drawing paper 19. As in the apparatus shown in Figs. 1 and 2 the scale to which the operator wishes to reproduce the object is regulated by advancing or retiring the apparatus to or from the reproduction surface.

If a distorted view of the subject to be copied is required, this may be obtained by canting or inclining the lens 17 as required, when a broadening or lengthening effect can be produced.

Although mention has been made in the specification that a sector of a double convex lens is employed, I would have it understood that an entire lens may also be used. In the latter case, however, the draftsman obtains a better sight by viewing the picture through any portion of the lens other than the center, as the angular view thus obtained has the effect of throwing the visually projected image farther away from the normal sight line so that a larger field is covered by the eye which views the visual projection.

What I claim and desire to secure by Letters Patent is:—

1. A reproducing apparatus, comprising a single lens, means for supporting said lens, and a screen carried by said lens-supporting means for allowing one eye of the operator to view only the object to be reproduced and the other eye to view only the surface on which the reproduction is to be made.

2. Apparatus for the purpose specified, comprising a lens, means for adjustably supporting said lens, means for holding said supporting means in adjusted position relatively to the object to be reproduced, and a screen carried by said lens-supporting means for separating the lines of vision of the eyes of the operator.

3. Apparatus for the purpose specified, comprising a lens, means for adjustably supporting said lens, means for adjustably supporting the object to be reproduced, means for holding said lens and object-supporting means in adjusted position relatively to the surface on which the reproduction of the object is to be made, and a screen carried by said lens-supporting means for separating the lines of vision of the eyes of the operator.

4. Apparatus for the purpose specified, comprising a lens, rotatably-mounted supporting means for said lens, and a screen carried by said lens-supporting means for separating the lines of vision of the eyes of the operator.

5. Apparatus for the purpose specified, comprising a lens, means for supporting said lens, a rod on which said supporting means is rotatably adjustable, a member in which said rod is adjustably secured, and a screen carried by said lens-supporting means for separating the lines of vision of the eyes of the operator.

6. Apparatus for the purpose specified, comprising a lens, means for supporting said lens, a rod on which said supporting means is rotatably adjustable, a member in which said rod is adjustably secured, said member being itself adjustable in a direction at right angles to the direction of adjustment of the rod, and a screen carried by said lens-supporting means for separating the lines of vision of the eyes of the operator.

7. Apparatus for the purpose specified, comprising a lens, means for supporting said lens, means for supporting the object to be reproduced, the lens-supporting means being carried by the object-supporting means, a pillar upon which the latter is slidably secured, and a screen carried by said lens-supporting means for separating the lines of vision of the eyes of the operator.

8. Apparatus for the purpose specified, comprising a lens, means for carrying said lens, a rod on which said carrying means is rotatably adjustable, a member in which said rod is adjustably secured, means for supporting the object to be reproduced, upon which means said member is slidably secured, a pillar upon which the object supporting means is slidably secured, and a screen carried by said lens carrying means for separating the lines of vision of the eyes of the operator.

9. Apparatus for the purpose specified, comprising a lens, means for supporting said lens, means for supporting the picture to be reproduced, spring clamping means for retaining said picture on said supporting means, and a screen carried by said lens-supporting means for separating the lines of vision of the eyes of the operator.

Signed at Sydney, New South Wales, this 12th day of July, A. D. 1911.

WALTER THOMAS SMITH O'BRIEN.

Witnesses:
WM. NEWTON,
CHAS. HATTON.